July 17, 1923.

W. H. SCHULZE 1,461,941

TRANSMISSION DRIVE

Filed June 23, 1922

INVENTOR.
WILLIAM H. SCHULZE.

WITNESS.
L. O. McKnight

BY Burton & Burton
His ATTORNEYS.

Patented July 17, 1923.

1,461,941

UNITED STATES PATENT OFFICE.

WILLIAM H. SCHULZE, OF CHICAGO, ILLINOIS, ASSIGNOR TO STEWART-WARNER SPEEDOMETER CORPORATION, OF CHICAGO, ILLINOIS, A CORPORATION OF VIRGINIA.

TRANSMISSION DRIVE.

Application filed June 23, 1922. Serial No. 570,482.

*To all whom it may concern:*

Be it known that I, WILLIAM H. SCHULZE, a citizen of the United States, residing in the city of Chicago, in the county of Cook and the State of Illinois, have invented certain new and useful Improvements in Transmission Drives, of which the following is a specification, reference being had to the accompanying drawings, forming a part thereof.

The purpose of this invention is to provide an improved detail construction for an instrument drive connection in a motor vehicle. It consists in the elements and features of construction shown and described, as indicated in the claims.

In the drawings:—

Figure 1:
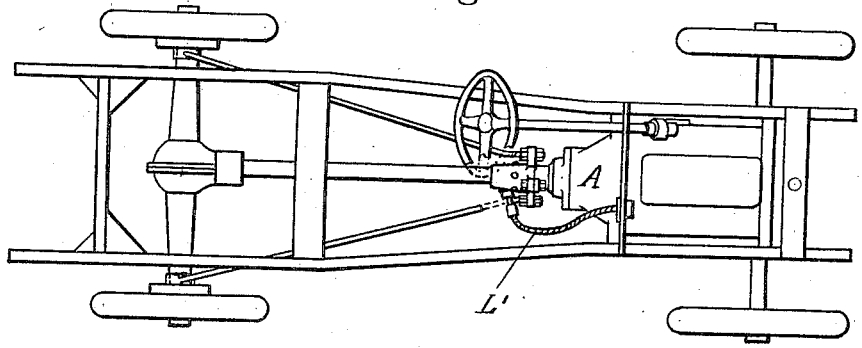
Figure 1 is a plan view of the chassis of a motor vehicle which is equipped with this invention.
Figure 2:
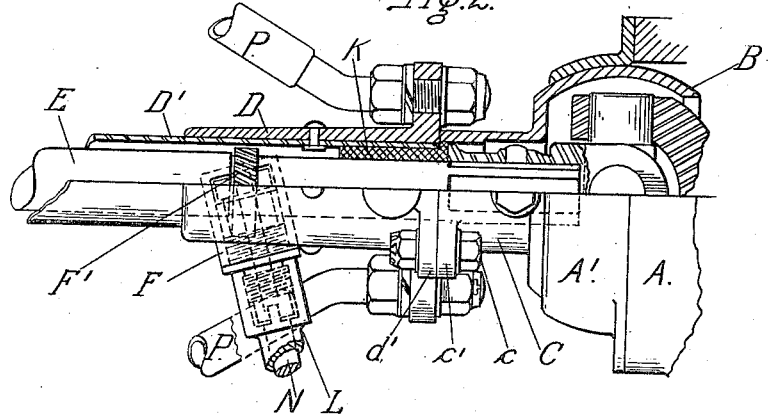
Figure 2 is a partly sectional plan view of a portion of the transmission casing propeller shaft and housing comprising the parts with which the features constituting this invention are connected, section being made radially of a propeller shaft.
Figure 4:
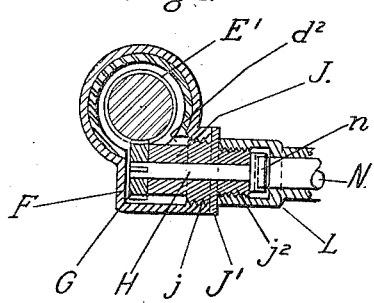
Figure 4 is a section at the line, 4—4, on Figure 3, with the propeller shaft in place, but disregarding the obliquity of the section with respect to the shaft axis.
Figure 3:
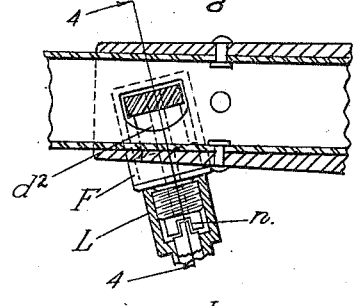
Figure 3 is a detail section in a horizontal plane in part axial with respect to the propeller shaft casing, and in part axial with respect to the journal bearing of the driven shaft concerned in the invention.

In respect to the general automobile construction the drawings show the parts in familiar form with relation to it. A is the transmission casing, $A^1$ the transmission casing member of the universal joint junction between the transmission casing and the propeller shaft housing. B is the spheroidal member of the universal joint pertaining to the propeller shaft housing of which C is a continuation which constitutes a ferrule for securing the pipe $D^1$, which constitutes the continuation of the propeller shaft casing. E is the propeller shaft. The two members, C and D, of the propeller-shaft-housing member of the universal joint are secured together in the customary manner by bolts, $c$, to the mated lugs, $c^1$ and $d^1$. P, P, are braces which extend from the member, D, divergently rearward to the rear axle. K is a steel bushing which affords journal bearing for the propeller shaft. $E^1$ is a spiral or twist gear cut in the propeller shaft, E. Immediately adjacent to the position of this gear, the member, D, is provided with a laterally positioned exteriorly protruding gear housing, F, constituting a pocket with respect to the part, D, the propeller shaft housing, $D^1$, being apertured to register with the opening in said pocket as seen at $d^2$. This pocket protrusion, F, has its axis offset laterally below the shaft, E, and extends forward obliquely with respect to said shaft, as seen clearly in Figure 2. The entrance to this pocket is interiorly threaded, the interior diameter of the thread being sufficient to admit into the pocket a gear, G, adapted to mesh with the gear, $E^1$, on the shaft, E, said gear, G, being made fast on its shaft, H, the shaft being journaled in the plug, J, which constitutes a closure for the pocket, being threaded for screwing into the interiorly screw-threaded mouth or entrance to the pocket, as seen at $j$, and outwardly from the flange, $J^1$, which affords a shoulder for screwing the closure member, J, tight into the interiorly threaded mouth of the pocket member, F; and said closure member is reduced in diameter and exteriorly threaded as seen at $j^2$, for receiving the terminal ferrule, L, of the casing of a flexible shaft, $L^1$, whose rotating member, N, is adapted for driving connection with the outer end of the shaft journaled in the closure member, as seen at $n$. The flexible shaft is designed to extend to an instrument to be driven which may be understood to be mounted upon the dash-board, as conventionally shown in Figure 1.

I claim:—

1. In a motor vehicle, an instrument drive connection comprising the propeller shaft housing member of a universal joint between said shaft housing and the transmission casing, said member having a gear pocket situated laterally of the propeller shaft the axis of said pocket extending forwardly and obliquely with respect to the shaft; a gear cut in the shaft at the entrance to said pocket; a screwed-in closure for said pocket having a journal bearing therethrough; a shaft journaled in said closure journal bearing; a gear on the inner end of said shaft meshing with the gear on the propeller shaft; said closure being exteriorly formed for attachment thereto of a casing of a flexible shaft, and the shaft journaled therein being exteriorly formed for coupling to the rotary member of the flexible shaft.

2. In the construction defined in claim 1, foregoing, the two gears mentioned being of the spiral or twist gear type, the axis of the gear pocket being offset laterally from the axis of the propeller shaft.

In testimony whereof, I have hereunto set my hand at Chicago, Illinois, this 20th day of June, 1922.

WILLIAM H. SCHULZE.